United States Patent
Toyonaga et al.

[11] Patent Number: 6,028,282
[45] Date of Patent: Feb. 22, 2000

[54] SYSTEM AND METHOD FOR WIRE CUT DISCHARGE MACHINING

[75] Inventors: Tatsuo Toyonaga; Yuji Kaneko; Masateru Minamikawa, all of Kanagawa, Japan

[73] Assignee: Sodick Co., Ltd., Kanagawa, Japan

[21] Appl. No.: 09/180,278

[22] PCT Filed: Mar. 9, 1998

[86] PCT No.: PCT/JP98/00966

§ 371 Date: Nov. 6, 1998

§ 102(e) Date: Nov. 6, 1998

[87] PCT Pub. No.: WO98/39128

PCT Pub. Date: Sep. 11, 1998

[30] Foreign Application Priority Data

Mar. 7, 1997 [JP] Japan ................................... 9-070732

[51] Int. Cl.[7] .................................................. B23H 7/10
[52] U.S. Cl. .................................................... 219/69.12
[58] Field of Search ........................ 219/69.12; 226/45; 242/416

[56] References Cited

U.S. PATENT DOCUMENTS

| | | | |
|---|---|---|---|
| 4,298,781 | 11/1981 | Inoue | 219/69.12 |
| 4,301,349 | 11/1981 | Inoue | |
| 5,023,420 | 6/1991 | Aso et al. | 219/69.12 |
| 5,166,490 | 11/1992 | Morishita et al. | 219/69.12 |
| 5,216,217 | 6/1993 | Morishita et al. | 219/69.12 |
| 5,324,909 | 6/1994 | Derighetti | 219/69.12 |

FOREIGN PATENT DOCUMENTS

| | | |
|---|---|---|
| 54-159797 | 12/1979 | Japan . |
| 2-185321 | 7/1990 | Japan . |
| 3-264213 | 11/1991 | Japan . |
| 4-261716 | 9/1992 | Japan . |
| 5-312657 | 11/1993 | Japan . |
| 7-68421 | 3/1995 | Japan . |

*Primary Examiner*—Geoffrey S. Evans
*Attorney, Agent, or Firm*—McDermott, Will & Emery

[57] ABSTRACT

A wire cut electric discharge machine including a device (6) for pulling a wire electrode (1) such that it travels along a wire transport path, a servo motor (4B) which applies tension to the traveling wire electrode, an NC device which generates a signal indicating a tension setting value; a tension detector (9) which detects the tension applied to the wire electrode and generates a signal indicating the detected value, and a tension control device which processes the signal indicating the tension setting value and the signal indicating the tension detection value, and commands the servo motor rotational speed. The tension control device includes a non-essential frequencies setting circuit (20) which sets non-essential frequencies and generates a signal indicating that setting value, and an electric filter device (19), which blocks non-essential frequencies based on the non-essential frequencies setting circuit output signal.

4 Claims, 7 Drawing Sheets

F I G. 3
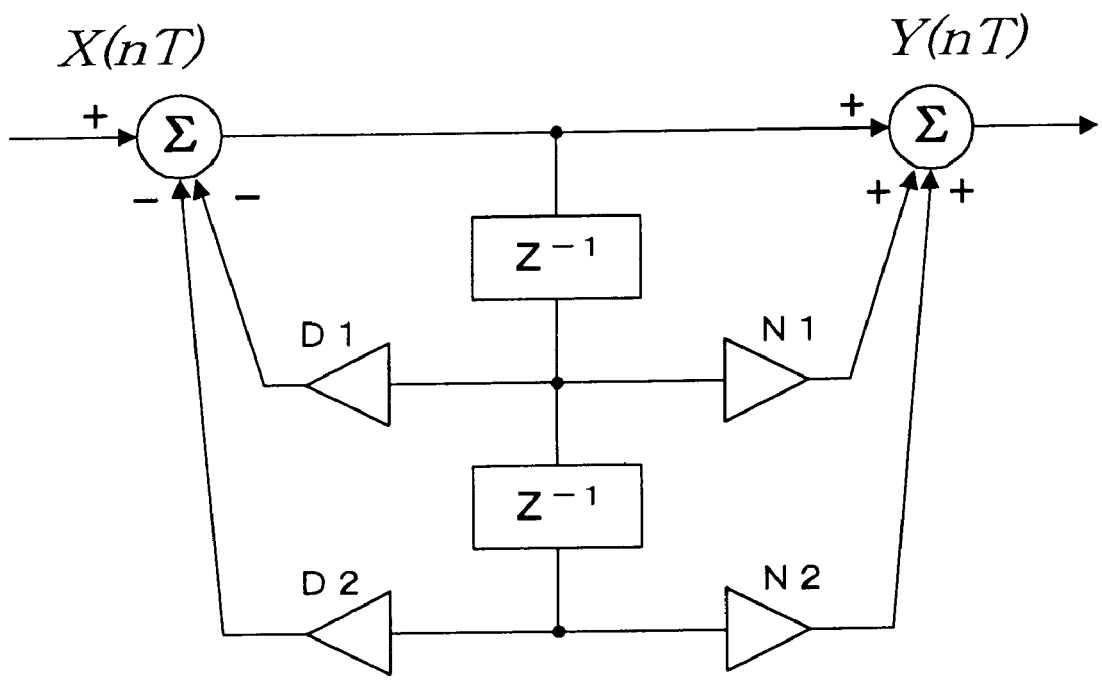

Wire Tension: 1600g
Wire Speed: 4m/min

Wire Tension: 800g
Wire Speed: 4m/min

Wire Tension: 1600g
Wire Speed: 8m/min

Wire Tension: 800g
Wire Speed: 8m/min

Wire Tension: 1600g
Wire Speed: 4m/min

Wire Tension: 800g
Wire Speed: 4m/min

Wire Tension: 1600g
Wire Speed: 8m/min

Wire Tension: 800g
Wire Speed: 8m/min

SYSTEM AND METHOD FOR WIRE CUT DISCHARGE MACHINING

FIELD OF THE INVENTION

The present invention relates to a wire cut electric discharge machine which machines a workpiece by generating an electric discharge between a wire electrode and the workpiece while conveying the wire electrode along a wire transport path with a fixed tension applied thereto. In particular, the invention relates to a wire cut electric discharge machine provided with a device which controls the tension applied to the wire electrode as it travels along the wire transport path.

BACKGROUND OF THE INVENTION

Generally in a wire cut electric discharge machine, the wire electrode travels in a direction which is essentially perpendicular to an X-Y plane between a pair of wire guides, while either the wire electrode or the workpiece moves relative to the other within the X-Y plane. During machining, a voltage pulse is applied to the gap formed between the wire electrode and the workpiece, and the workpiece is machined by the electric discharge generated in that gap as though the workpiece were being cut by a thread. This type of wire cut electric discharge machine has a high machining accuracy and is appropriate for precision machining.

Wire electrodes having a diameter of 0.01–0.3 mm are normally guided from a wire bobbin through multiple pulleys and a wire tensioning device to a pair of wire guides arrayed respectively above and below the workpiece. Furthermore, the wire electrode is conveyed through multiple pulleys and a wire pulling device to an appropriate recovery device. The wire pulling device is controlled such that the wire electrode travel speed is maintained at a set value. The tensioning device is controlled such that the tension imparted to the wire electrode reaches a set value. Wire electrode tension is set in accordance with, for example, the wire electrode diameter and material, and the type of machining performed. If that tension is set at a large value, good wire electrode straightness between the pair of wire guides is obtained. However, if excessive tension is applied, undesirable breakage of the wire electrode may be induced.

SUMMARY OF THE INVENTION

An object of the present invention is to provide a wire cut electric discharge machine which reliably maintains a set wire electrode tension value.

Another object of the present invention is to provide a wire cut electric discharge machine which reduces variations in wire electrode tension.

Other objects of the present invention are partially described in the explanation below, or will be apparent to practitioners of the art through implementation of the invention.

In order to achieve the above-described and other objectives, the wire cut electric discharge machine of the present invention includes a device which conveys a wire electrode such that the wire electrode travels along a specified transport path, a servo motor which imparts tension to the traveling wire electrode, an NC device which generates a signal indicating the tension setting value signal, a tension detector which detects the tension applied to the wire electrode and generates a signal indicating the detected value, and a tension control device which corrects the speed command signal which commands the rotational speed of the servo motor; the tension control device includes a non-essential frequencies setting device, which sets a non-essential frequencies signal and generates a signal indicating the setting value, and an electric filter device, which blocks non-essential frequencies based on the output signal from the non-essential frequencies setting device.

Preferably, the non-essential frequencies setting device sets non-essential frequencies based on the output signal from the tension detector.

The wire cut electric discharge machine of the present invention further includes a memory which records data indicating the relationship between the wire electrode diameter, material, etc. and the non-essential frequencies. The non-essential frequencies setting device may also set the non-essential frequencies based on the data stored in that memory.

Furthermore, the wire cut electric discharge method according to the present invention, in which a workpiece is machined by generating an electric discharge between a wire electrode traveling along a transport path in a state of tension applied by a motor and the workpiece includes, a step of generating a signal which indicates the wire electrode tension setting value;

a step of conveying the wire electrode along a transport path;

a step of generating a speed command signal which commands the motor rotational speed;

a step of detecting the tension applied to the traveling wire electrode and for generating a signal indicating the resulting detection value;

a step of correcting the speed command signal based on the signal which indicates the detected value of the wire electrode tension, and a step of filtering to block non-essential frequencies based on that setting.

BRIEF DESCRIPTION OF FIGURES

FIG. 3 illustrates an example of a notch filter of FIG. 2.

PREFERRED EMBODIMENT OF THE INVENTION

An exemplary wire cut electric discharge machine according to the present invention will now be explained with reference to FIG. 1 and FIG. 2.

Figure 1:
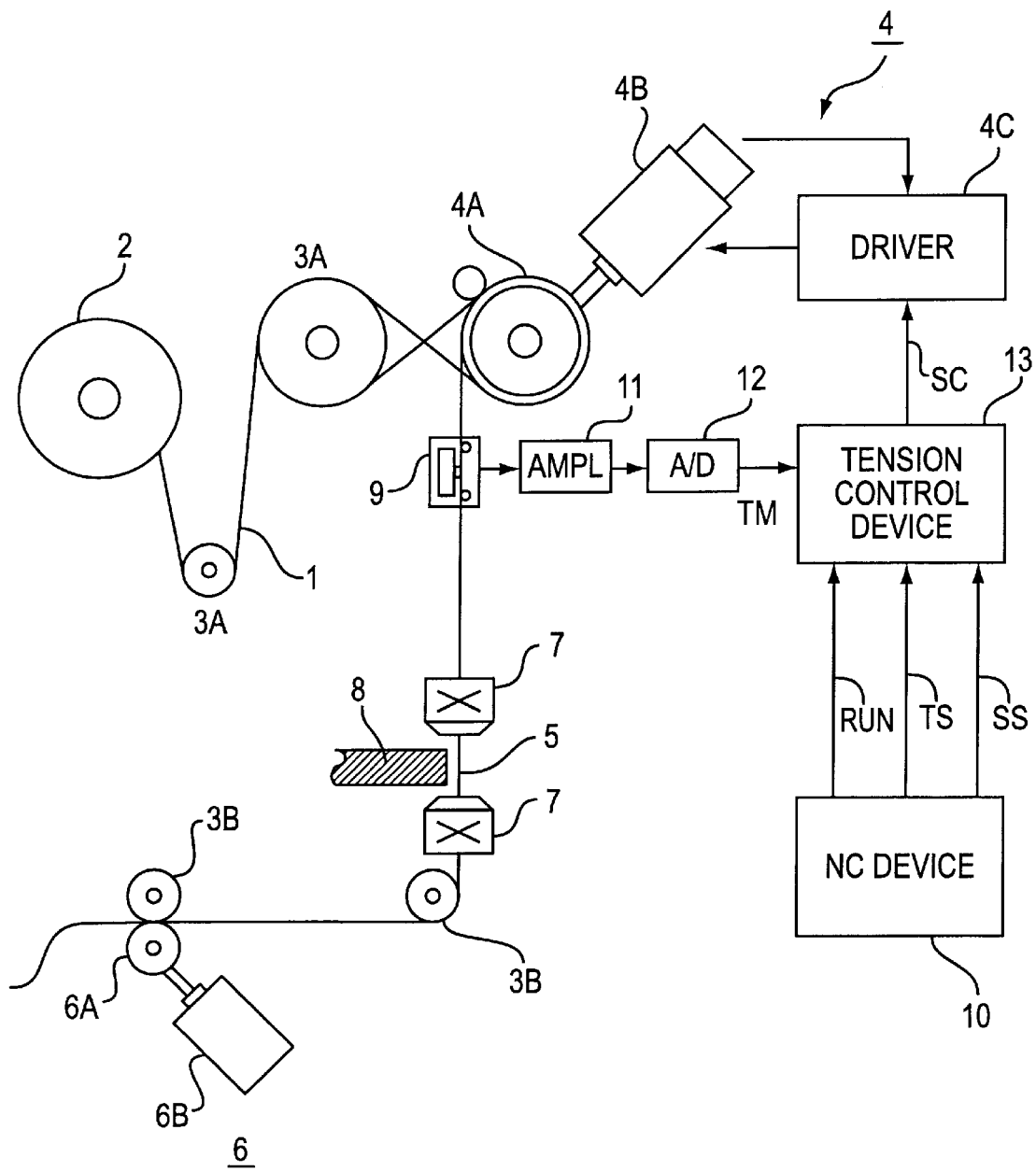
FIG. 1 illustrates the wire cut electric discharge machine of the present invention.

As illustrated in FIG. 1, the wire electrode 1 is conveyed from a wire bobbin 2 through a brake pulley 4A and tension detector 9 to a pair of wire guides 7. The pair of wire guides 7 guide the travel of the wire electrode 1 and determine the position of the wire electrode 1 in an X-Y plane. The workpiece 8 is machined in a region 5 formed between those wire guides 7. The wire pulling device 6 conveys the wire electrode 1 through multiple pulleys 3B to an appropriate wire electrode recovery device (not shown). The wire pulling device 6 includes a pulley 6A positioned on the wire transport path, and a motor 6B linked to the pulley 6A. The device which controls the travel speed of the wire electrode 1 (not shown) determines the rotational speed of the motor 6B based on a setting value stored in the NC device 10.

A tensioning device 4 imparts a tension to the wire electrode 1 in order to maintain the straightness of wire electrode 1 as it travels between the pair of wire guides 7. The appropriate tension is set and recorded in the NC device 10 in accordance, for example, with the diameter and material of wire electrode 1 and the type of machining performed. The tensioning device 4 comprises a brake pulley 4A, which imparts friction to the wire electrode 1, the servo motor 4B which is linked to the brake pulley 4A, and a servo driver 4C. A speed detector which detects the rotational speed of the servo motor 4B is attached to the servo motor 4B. The tension on wire electrode 1 is detected by means of a tension detector 9 comprising, for example, a strain gauge. The output of the tension detector 9 is supplied through a amplifier circuit 11 and analog-digital converter 12 to a tension control device 13 as a digital signal TM indicative of the tension on the wire electrode 1. In addition, the tension control device 13 receives the NC device 10 output signals RUN, TS, and SS. The RUN signal is a signal which commands the travel of the wire electrode 1; that operation is commenced when the tension control device 13 receives this RUN signal. The signals TS and SS respectively indicate the set values of the wire tension and the wire travel speed. The tension control device 13 supplies a signal SC to the servo driver 4C which commands the rotational speed of the servo motor servo motor 4B. The servo driver 4C supplies a current to the servo motor 4B in accordance with the signal SC.

Details of the tension control device 13 are explained with reference to FIG. 2. The tension control device 13 receives the signals TS and SS of the speed command generating circuit 14, which supplies a speed command signal indicating the rotational speed of the servo motor 4B. The speed command generating circuit 14 seeks an appropriate motor rotational speed in order to achieve the tension setting value on the wire electrode 1. The tension control device 13 further comprises an adder 15, an amplifier 16, an integrator 17, and an adder 18. These elements correct the speed command signal based on the difference between the wire tension set value and the detected value of wire tension. The adder 15 receives the signals TS and TM and outputs a signal TC indicative of the difference in those values. This difference-indicating signal TC is supplied to one input of the adder 18 through the amplifier 16 and is further supplied to another input of the adder 18 via the integrator 17. The adder 18 corrects the speed command signal supplied from the speed command generating circuit 14 and supplies the signal SC indicating the rotational speed of the servo motor 4B to the servo driver 4C.

In this manner, the tension control device 13, the tensioning device 4, the wire electrode 1, the tension detector 9, the amplifier circuit 11, and the analog-digital converter 12 form a feedback system having a characteristic vibrational count. This feedback system resonates by means of outside forces produced by elements such as the pulleys mounted along the wire transport path. This resonance causes the tension on the wire electrode 1 to fluctuate. As a result of that tension fluctuation, an undesirable stripe extending in the direction of travel of the wire electrode 1 may be formed in the machining surface of the workpiece 8. In order to suppress this type of resonance induces tension fluctuation, an electric filtering device, which blocks resonant frequencies in the feedback system from the adder 15 output signal TC, is provided in the tension control device 13. In the illustrated embodiment, this electric filtering device may comprise a notch filter 19, which blocks the signals having a frequency in a predetermined band. For example, this notch filter 19 may be implemented, as shown in FIG. 3, as a digital filter which implements a recursive differential equation. This digital filter has 4 variable filter coefficients D1, D2, N1, and N2, and can function as a notch filter or low-pass filter depending on these filter coefficients.

Figure 4:
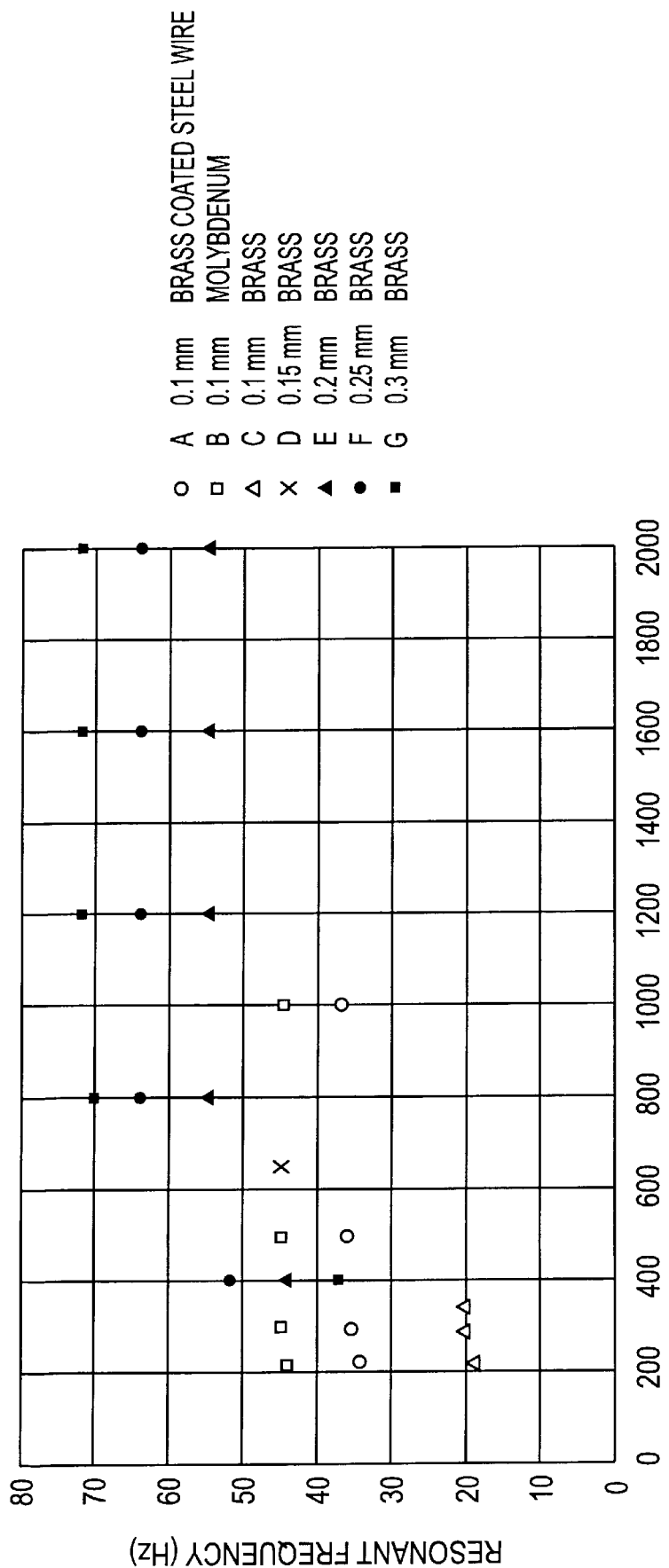
FIG. 4 is a graph depicting resonant frequencies as a function of wire electrode tension with respect to various wire electrodes.

However, as shown in FIG. 4, the resonant frequencies to be blocked in the feedback system vary according to the diameter and material of the wire electrode 1. FIG. 4 is a graph in which observed resonant frequency values are plotted with respect to tension on the wire electrode. Position marks A and B respectively indicate a 0.1 mm diameter brass coated copper wire and a 0.1 mm diameter molybdenum wire. Position marks C, D, E, F, and G respectively indicate brass wires of diameter 0.1 mm, 0.15 mm, 0.2 mm, 0.25 mm, and 0.3 mm. Referring to position marks E, F, and G, it can be seen that resonant frequency varies according to differences in the diameter of the wire electrode being used. Similarly, when the tension applied to the wire electrode is in a range between 800 g and 2000 g, if the wire electrode diameter and material are the same, the resonant frequency is virtually the same regardless of differences in tension. Referring to position marks A, B, and C, it can be seen that resonant frequency varies with differences in the material of the wire electrode material used. The tension control device 13 according to the present invention therefore includes a non-essential frequencies setting device 20, which sets the frequencies to be blocked by the filter 19 such that the filter device 19 reliably blocks only the non-essential frequencies. The non-essential frequencies setting device 20 separates the signal TM into its component frequencies by a fast Fourier transform (FFT) and determines the frequency[ies] with the largest amplification; the notch filter 19 sets the frequency band to be blocked according to the frequency of largest amplification. In the illustrated embodiment, the non-essential frequencies setting device 20 supplies signals indicating 4 filter coefficients—D1, D2, N1, and N2—to the notch filter 19. The frequency band blocked by the notch filter 19 is determined by these filter coefficients. The tension control device 13 further comprises a switching circuit 21, for bypassing or isolating the notch filter 19 from the wire tension control feedback system. The switching circuit 21 has an input A which receives the output signal from the notch filter 19, and an input B which receives the output signal from the adder 15. Either the input A or the input B is supplied to the amplifier 16 and the integrator 17 in accordance with a command signal from the non-essential frequencies setting device 20.

The operation of the tension control device 13 is explained with reference to FIG. 5. Before the operation of the tension control device 13, the wire electrode tension and travel speed are set within the NC device 10, and those set values are stored. Operation first commences when the tension control device 13 receives the RUN signal from the NC device 10 at step S1. At step S2, the non-essential frequencies setting device 20 input data size "n" is set to "0." At step S3, the non-essential frequencies setting device 20 generates a command signal instructing the switching circuit 21 to use the input B thereof as an output signal. As a result, the notch filter 19 is excluded from the wire tension control feedback system. At step S4, the tension control device 13 inputs the signals TM, TS, and SS and commences processing of those signals. At step S5, the speed command generating circuit 14 receives the signals TS and SS and provides a speed command signal which indicates the rotational speed of the servo motor 4B. This speed command signal is corrected by a value obtained by amplifying the difference between the set value and the detected value of wire tension, and the integral value of that difference. At step S6, the adder 18 commences the output of a signal SC, which indicates this corrected speed command signal. At step S7, the non-essential frequencies setting device 20 inputs the digital signal TM and collects data showing wire tension, until the data size "n" reaches a specified size, for example 100. When the non-essential frequencies setting device 20 receives a RUN signal, it stops collecting wire tension data at step S8, and operation of the tension control device 13 ends. If the data size "n" reaches 100 at step S9, the operation proceeds to step S10. At step S10, the non-essential frequencies setting device 20 processes the collected data, seeks a characteristic vibrational count for the feedback system, and sets the filter coefficients of the notch filter 19. The non-essential frequencies setting device 20 sends a signal indicating these settings to the notch filter 19, while at the same time, at step S11, the switching circuit 21 generates a command signal which instructs the switching circuit 21 to use that input A as its output signal. As a result, the notch filter 19 is inserted into the wire tension control feedback system. The operation of the tension control device 13 continues until reception of the RUN signal ceases at step S12.

Figure 2:
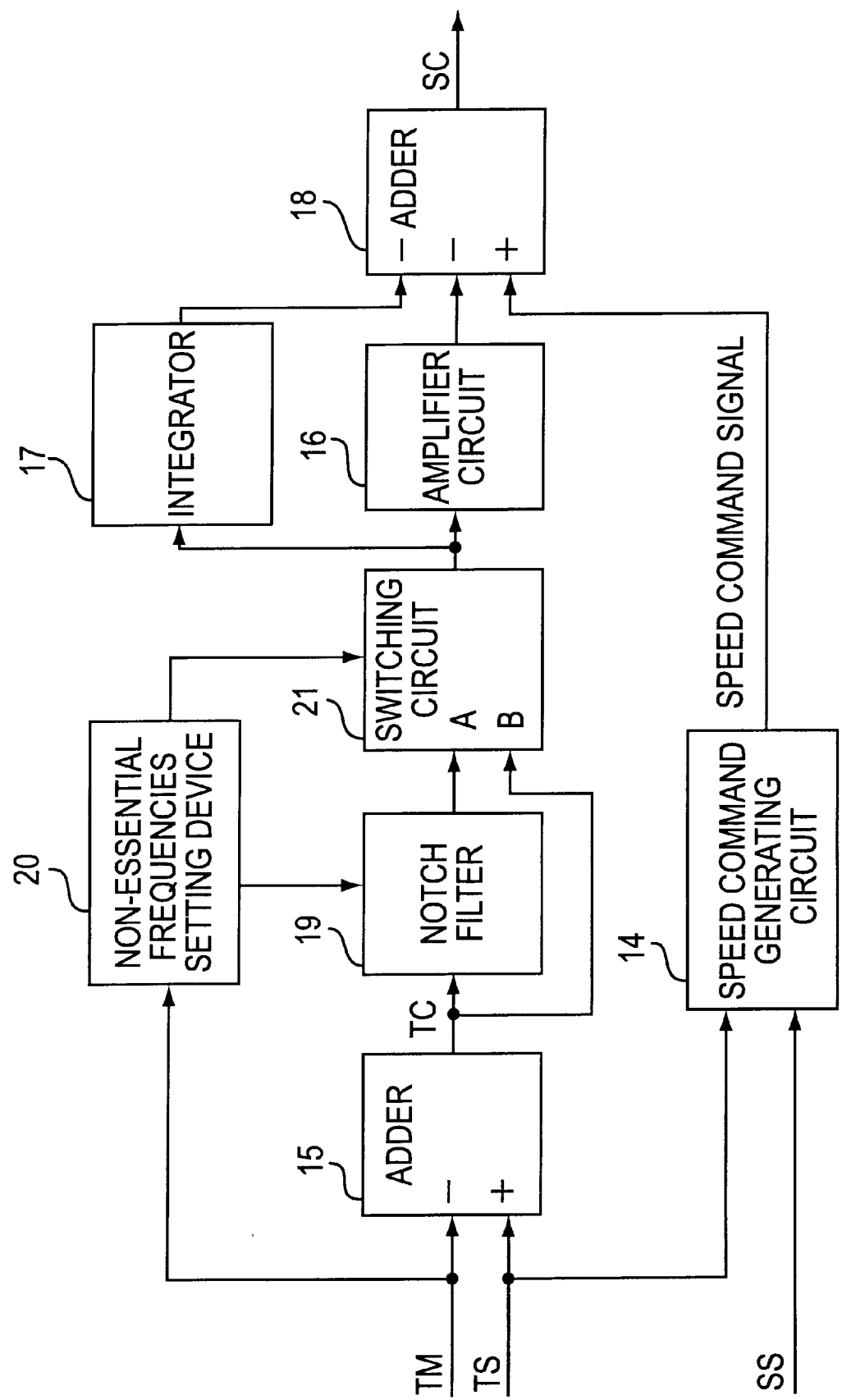
FIG. 2 illustrates the tensioning device of FIG. 1.

FIG. 6(A), FIG. 6(B), FIG. 6(C), and FIG. 6(D) show the voltage signal which indicates the values detected for tension applied to a 0.2 mm diameter brass wire when the input B on switching circuit 21 in FIG. 2 is used as the output signal. The vertical axis in the graph indicates tension (g), and the horizontal axis indicates time (ms) with respect to the waveform for this tension signal. The amplitudes for the frequencies obtained by separation of the tension signal into its frequency components using fast Fourier transforms (FFT) are also respectively displayed. With respect to these amplitudes, the vertical axis of the graph indicates amplitude (dB), and the horizontal axis indicates frequency (Hz). The respective waveforms relate to a wire which in FIG. 6(A) has been set to a tension of 1,600 g and a travel speed of 4 m/minute. Similarly, in FIG. 6(B), the wire tension is 800 g and the travel speed is 4 m/minute; in FIG. 6(C) the wire tension is 1,600 g and the travel speed is 8 m/minute; in FIG. 6(D), the wire tension is 800 g, and the travel speed is 8 m/minute. As is clear from these graphs, the tension control feedback system resonant frequency is in the range of 55–59 Hz when a 0.2 mm brass wire is used, regardless of the wire tension and wire travel speed. Also, it can be understood from these graphs that when the travel speed is high, resonant frequency amplitude increases.

FIG. 7(A), FIG. 7(B), FIG. 7(C), and FIG. 7(D) show the voltage signals indicating the detected values for tension applied to a 0.2 mm diameter brass wire, and the amplitudes of the respective frequencies of those signals, when the input A of the switching circuit 21 in FIG. 2 is used as an output signal. FIG. 7(A), FIG. 7(B), FIG. 7(C), and FIG. 7(D) are respectively the same as FIG. 6(A), FIG. 6(B), FIG. 6(C), and FIG. 6(D) with respect to wire tension and wire travel speed. It may be seen from these graphs that fluctuations in wire tension are suppressed by the insertion of the notch filter 19 in FIG. 2 to the feedback system.

It is not intended that the present invention be limited to the disclosed form. It is clear that numerous improvements and variations are possible by reference to the description given above. For example, as is illustrated in FIG. 2, the notch filter 19 is used as a filter to block non-essential frequencies, but on the other hand the digital filter in FIG. 3 may be used to function as a low pass filter. In that case, the non-essential frequencies setting device 20 supplies a signal which indicates a filter coefficient to the digital filter such that the digital filter blocking frequency will be the feedback system resonant frequency. Also, instead of the notch filter 19, multiple filters blocking different frequencies may also be used. In that case, the respective outputs of these multiple filters would be connected to the respective different inputs of the switching circuit 21. With the non-essential frequencies setting device 20, an appropriate filter may be selected from the multiple filters available by sending a command signal to the switching circuit 21. Also, the position of the notch filter 19 is not limited to the embodiment of FIG. 2. In the notch filter 19, the speed command signal SC which is the input to the tensioning device 4 may be inserted anywhere in the feedback control loop, which is corrected based on the difference between the wire tension detection value, which is the output of the tensioning device 4, and the tension setting value.

Figure 5:
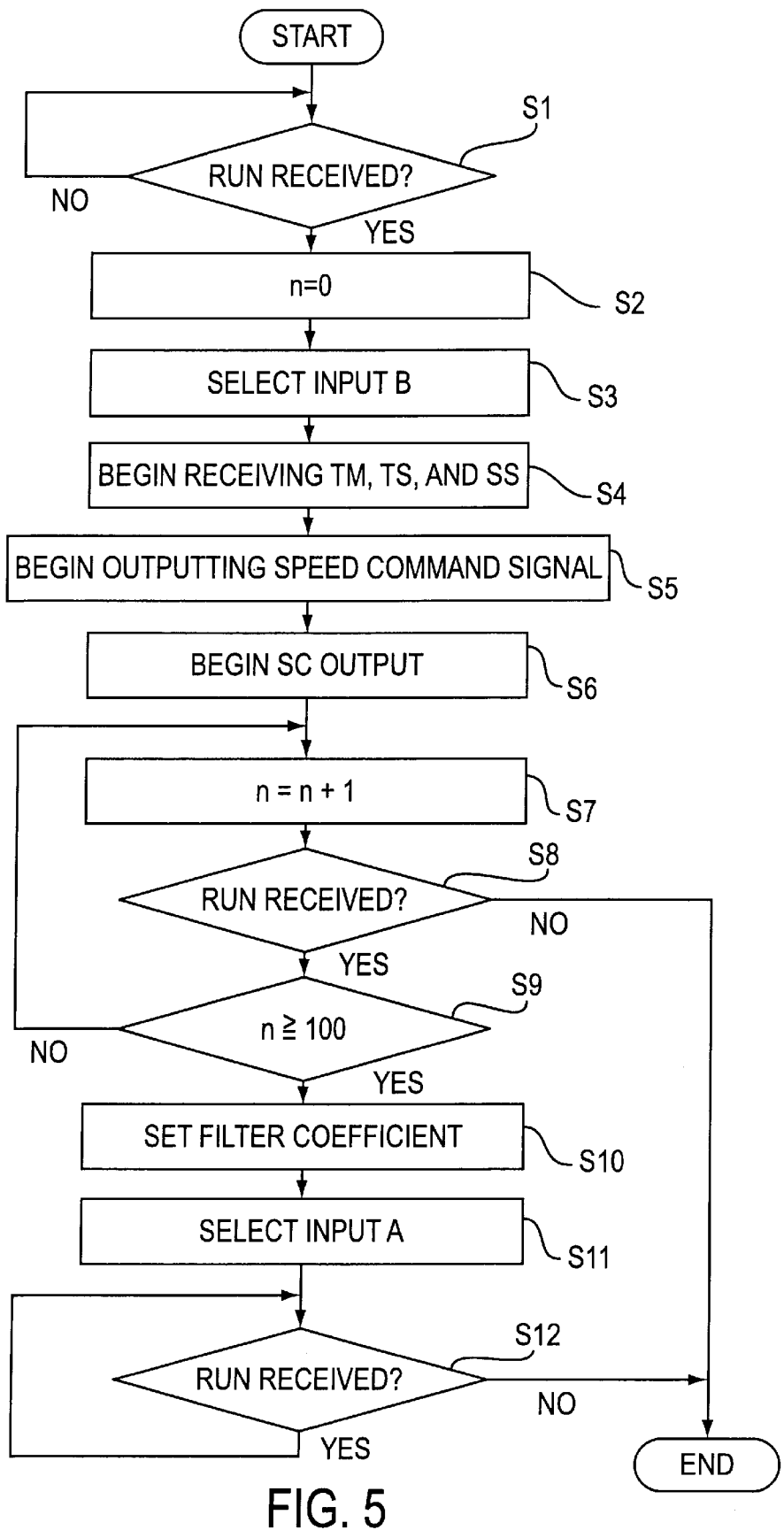
FIG. 5 is a flow chart depicting the operation of the tensioning device in FIG. 2.
Figure 6A:
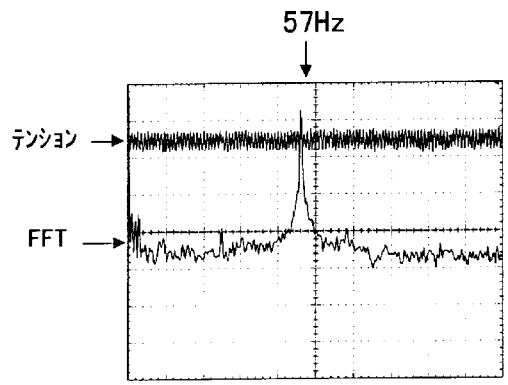
FIG. 6(A), FIG. 6(B), FIG. 6(C), and FIG. 6(D) are graphs depicting waveforms of signals indicating tension applied to wire electrodes when a filter device is not included in the tension control feedback system.
Figure 6B:
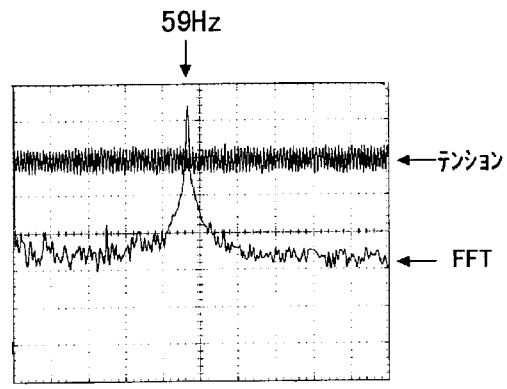
Figure 6C:
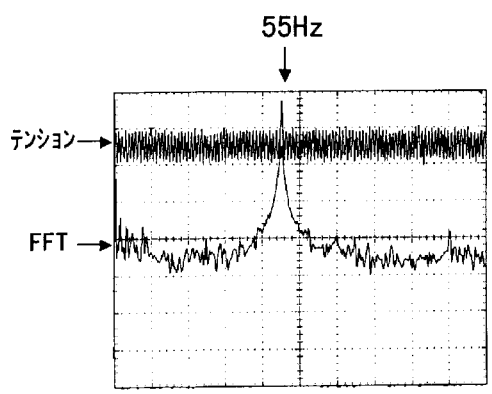
Figure 6D:
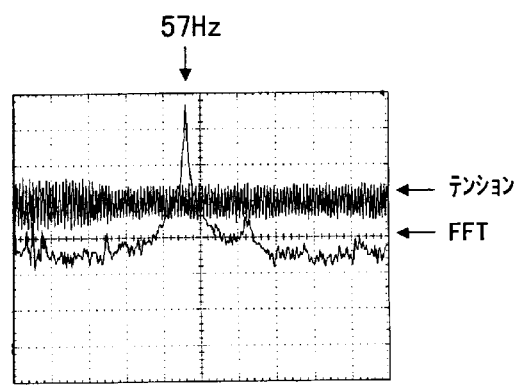
Figure 7A:
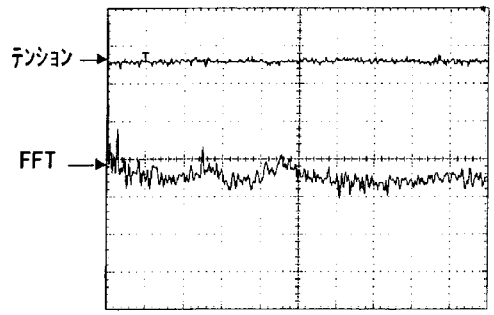
FIG. 7(A), FIG. 7(B), FIG. 7(C), and FIG. 7(D) are graphs depicting waveforms of signals indicating the tension applied to wire electrodes when the filter device according to the invention is RUN signal a tension control feedback device.
Figure 7B:
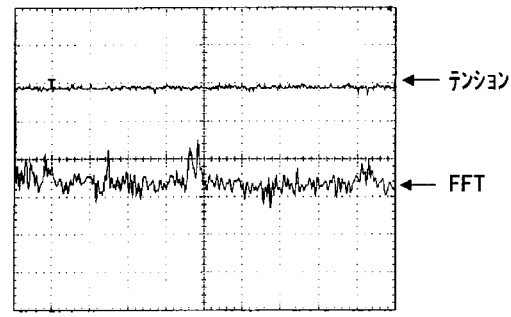
Figure 7C:
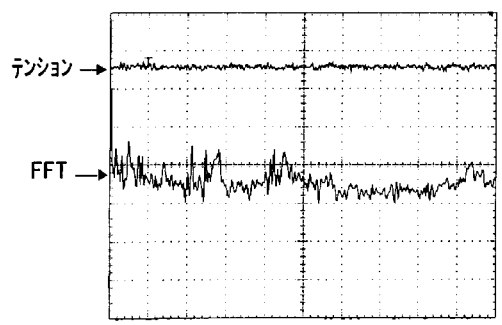
Figure 7D:
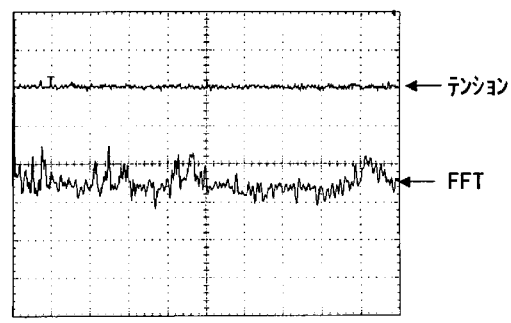

As is illustrated in FIG. 5, after the non-essential frequencies setting device 20 has received the RUN signal from NC device 10, it inputs the signal TM and begins to seek the resonant frequency. Alternatively, as is illustrated in FIG. 4, it is also possible to seek information relating to the wire electrode used by pre-measuring, for example, the relationship between the wire diameter and material and its resonant frequency, and storing the data which describes that relationship in an appropriate memory. The non-essential frequencies setting device 20 may also be arranged to supply a signal indicative of filter coefficients to the notch filter 19, based on the data thus stored, before receiving the RUN signal.

The illustrated embodiment was selected in order to describe the essence of the present invention and its practical application. The scope of the invention is defined by attached claims.

We claim:

1. A wire cut electric discharge machine which machines a workpiece by generating an electric discharge between a traveling wire electrode and a workpiece comprising:

a means for pulling a wire electrode such that the wire electrode travels along a wire transport path;

a motor for applying a tension to the traveling wire electrode;

a means for generating a signal indicating a tension setting value;

a tension detection means for detecting the tension applied to the wire electrode and generating a signal indicating the detected value, and a tension control device which, based on the difference between the tension setting value and the tension detected value, corrects the speed command signal which commands the rotational speed of the motor;

the tension control device comprising a non-essential frequencies setting means, which sets non-essential frequencies and generates a signal indicating the tension setting value, and an electric filter device which blocks non-essential frequencies based on the output signal from the non-essential frequencies setting means.

2. The wire cut electric discharge machine according to claim 1, wherein the non-essential frequencies setting means sets the non-essential frequencies based on the output signal of the tension detection means.

3. The wire cut electric discharge machine according to claim 1, wherein the tension control device further comprises a memory for storing data indicating the relationship between wire electrode information and resonant frequency of the wire electrode.

4. In a wire cut electric discharge machining method for machining a workpiece by generating an electric discharge between a wire electrode traveling along a transport path under a tension applied by a motor, and a workpiece, said wire cut electric discharge machining method comprises:

a step of generating a signal indicating wire electrode tension setting value;

a step of transporting the wire electrode along a transport path;

a step of generating a speed command signal which commands the rotational speed of the motor;

a step of detecting the tension applied to the wire electrode and for generating a signal indicating the detected value;

a step of correcting the speed command signal based on the difference between the setting value and the wire electrode tension detected value;

a step of setting non-essential frequencies which vary the tension based on a signal indicating the wire electrode tension detection value; and a step of selectively inserting a settable filter for blocking non-essential frequencies based on the settings thereof.

* * * * *